United States Patent [19]

Selig

[11] Patent Number: 5,780,777

[45] Date of Patent: Jul. 14, 1998

[54] COMPENSATION FOR HYSTERESIS EFFECTS IN FORCE TRANSDUCERS

[75] Inventor: Klaus Peter Selig, Hechingen, Germany

[73] Assignee: Bizerba GmbH & Co. KG, Balingen, Germany

[21] Appl. No.: 813,793

[22] Filed: Mar. 6, 1997

Related U.S. Application Data

[63] Continuation of PCT/EP95/03103 published as WO96/07876 Mar. 14, 1996.

[30] Foreign Application Priority Data

Sep. 9, 1994 [DE] Germany .................. 44 32 109.0

[51] Int. Cl.$^6$ ................................. G01G 3/00
[52] U.S. Cl. .................. 177/25.11; 177/25.13; 177/211; 177/50; 73/1.15; 73/1.13
[58] Field of Search ............... 177/25.11, 25.12, 177/25.13, 25.19, 211, 229, 50, 25.14; 364/567; 73/1.13, 1.15

[56] References Cited

U.S. PATENT DOCUMENTS

| 4,281,731 | 8/1981 | Solder et al. .................. 177/229 |
| 4,375,243 | 3/1983 | Doll .......................... 177/25.11 |
| 4,529,050 | 7/1985 | Mosher et al. ................ 177/25.11 |
| 4,751,973 | 6/1988 | Freeman et al. ............... 177/25.11 |
| 5,117,929 | 6/1992 | Nakamura et al. ............. 177/211 |
| 5,308,931 | 5/1994 | Griffen ....................... 177/25.14 |

FOREIGN PATENT DOCUMENTS

| 0457134 | 11/1991 | European Pat. Off. . |
| 2193476 | 2/1974 | France . |
| 2554585 | 5/1985 | France . |
| 2919227 | 11/1980 | Germany . |
| 1479192 | 7/1977 | United Kingdom . |
| 2008773 | 6/1979 | United Kingdom . |

OTHER PUBLICATIONS

1992 Data Converter Reference Manual, vol. II, Analog Devices, pp. 2-9 to 2-10.

*Primary Examiner*—Michael L. Gellner
*Assistant Examiner*—Randy W. Gibson
*Attorney, Agent, or Firm*—Shenier & O'Connor

[57] ABSTRACT

In order, in a weighing device, in particular for use in high-resolution scales, comprising an elastically deformable force transducer, a sensor arrangement for converting the deformation of the force transducer caused on account of a force F acting on the force input section of the force transducer into an electrical weighing signal and a processing unit for calculating a weighing signal corrected by the hysteresis error of the force transducer, to be able to realize a correction of the hysteresis error even with the short-term load variations occurring in practice in high-resolution scales at an acceptable cost, it is suggested that the sensor arrangement comprise a first testing unit for the high-resolution determination of the weighing signal "S" and a second testing unit for the determination of the elastic deformation of the force transducer in small time increments (high time resolution), wherein the processing unit corrects the high-resolution weighing signal of the first testing unit by the hysteresis error on the basis of data made available by the second testing unit.

12 Claims, 2 Drawing Sheets

COMPENSATION FOR HYSTERESIS EFFECTS IN FORCE TRANSDUCERS

This application is a continuation of co-pending International Application PCT/EP95/03103 (WO96/07876) filed on Aug. 4, 1995, status pending.

BACKGROUND OF THE INVENTION

1. Field of the Invention

The invention relates to a weighing device, in particular for use in high-resolution scales, comprising an elastically deformable force transducer, a sensor arrangement for converting the deformation of the force transducer caused on account of a force F acting on the force input section of the force transducer into an electrical weighing signal and a processing unit for calculating a weighing signal corrected by the hysteresis error of the force transducer.

2. Prior Art

Weighing devices of this construction are used nowadays in large numbers in gauged and non-gauged weighing technology up to resolutions of 10,000 divisional steps.

A known construction of the force transducer with deformable body is used in the case of the load cell with strain gauge, in which the strains at the surface of the elastically deformable force transducer caused by the force to be measured are converted with the aid of strain gauges into a change in the electrical resistance of these strain gauges. In addition, sensor arrangements operating capacitively and those with vibrating strings are known.

Weighing devices with this type of construction have fundamental measuring errors which are caused by the elastic material properties of the material used for the production of the elastically deformable force transducer which deviate from the ideal state. These measuring errors become apparent, in particular, in the case of high-resolution scales when these are loaded with a jolt, for example, when the product to be weighed is allowed to fall onto the weighing dish of the scales.

In this respect, a hysteresis error manifests itself, in particular, in the fact that the signal emitted by the force transducer for a certain load is dependent on whether the deformation of the force transducer corresponding to the certain load is attained as a result of an increasing or decreasing load.

This error is therefore attributable to material properties which can be designated as "memory effect".

To correct the hysteresis error, mathematical methods are known which are employed in the measured value processing of the output parameter of the force transducer.

Examples for this type of correction of the hysteresis error are given in British patent specification GB 1479192-B and European patent specification EP 0 457 134-A2. Both publications disclose mathematical methods in the form of polynomial approximations, with which hysteresis correction values stored as a function of the direction of loading of the weighing system are respectively processed with the calculated measured value and subsequently issued as a weight value corrected by the hysteresis error.

A technical difficulty, which has so far restricted the practical use of such a method or even falsified the effect of these methods, does, however, result during the realization of the mathematical correction of the hysteresis error. The reason for this difficulty is to be found in the time response of the elastic property of the elastically deformable force transducer material which leads to the hysteresis error as well as in the time response of the evaluation circuit required for the operation of the force transducer, in particular the analog-digital converter often used for this purpose.

It does become apparent that the cited memory effect of the elastically deformable force transducer material which results in the hysteresis appears very quickly when the force transducer is loaded. If, when a certain loading state of the force transducer is approached, this loading state is exceeded only for a very short time of less than 1 ms, the elastically deformable force transducer material already knows that the loading state which finally results has been approached from above, i.e. from a range of higher loads, and the output signal of the sensor arrangement is different to the case, in which the same load state is approached from below, i.e. from the range of lower loads (corresponding to a gradually increasing load on the scales). This difference is the hysteresis error already cited. Such a variation in the loading state results during practical operation of a force transducer in scales in that, in many cases, the product to be weighed causes a jolt when placed on the scales, as a result of which the force transducer experiences for a short time a force which can be considerably higher than the static force of the weight of the product to be weighed itself and which is then the cause of a reversal of the hysteresis value from plus to minus or vice versa.

The specified methods do allow a correction of a hysteresis error in a so-called "quasi-static" operation. However, as a result, in particular, of the long conversion times of the customary analog-digital converters, it is not possible to reliably determine the hysteresis error in types of operation with jolt-like loading when the load is placed on a weighing device with very short-term load variations. This mode of operation with the jolt-like loading is, however, to be considered as the normal case in the practical operation of scales.

Furthermore, known measures, such as, for example, the selection of a suitable material for the production of the elastically deformable force transducer as well as the setting of a specific material state, are not sufficient to reduce the hysteresis error such that it is negligible in the case of scales with a higher resolution.

SUMMARY OF THE INVENTION

The object of the invention is, therefore, to further develop a weighing device of the specified type such that a correction of the hysteresis error can be realized even with the short-term load variations occurring in practice in high-resolution scales at an acceptable cost.

This object is accomplished in accordance with the invention in that the sensor arrangement comprises a first testing unit for the high-resolution determination of the weighing signal and a second testing unit for the determination of the elastic deformation of the force transducer in small time increments (high time resolution), wherein the processing unit corrects the high-resolution weighing signal of the first testing unit by the hysteresis error on the basis of data made available by the second testing unit.

For the operation of force transducers of the specified type of construction, analog-digital converters with resolutions in the range of 16 to 20 bits (corresponding to approximately 65,000 to 1,000,000 steps) are often used for digitalizing the measured parameter, i.e. weighing signal, these converters typically requiring conversion times of 10 to 50 ms. For correcting the hysteresis error in the measured value processing, a conversion time in the range of 10 to 50 ms is unacceptable in view of the memory effect of the force transducer material which already occurs within 1 ms. With such a conversion time, the determination of the direction of loading, from which the final load state is reached, which is necessary for a correction of the hysteresis error in the measurement processing, cannot be realized.

The invention suggests for this purpose that an additional, second testing unit, which is used for determining the elastic deformation of the force transducer in small time increments (high time resolution), be provided in the sensor arrangement alongside a first testing unit which, as already customary, serves for the high-resolution determination of the weighing signal. The processing unit can then also process the important data received from the second testing unit and documenting the course of the individual weighing process, i.e. the processing unit receives by way of the data of the second testing unit information concerning the direction of loading, in which the final load state is reached.

It has been shown that the determination of the elastic deformation of the force transducer in small time increments (high time resolution) as a basis for the hysteresis correction subject to a 1% error is already sufficiently exact. This means that an 8 bit resolution of the weighing signal is already sufficient with the timed determination of the weighing procedure. In the case of analog-digital converters with a resolution of only 8 bits, it is easy to operate with conversion times under 1 ms whereas, on the other hand, the known, slower, first testing unit can still be used for the high-resolution determination of the weighing signal, conversion times of up to 50 ms for the pure weighing procedure itself being completely adequate.

A somewhat more exact estimation includes the propagation speed of jolt-like deformations in solid bodies which is equal to the speed of sound in the solid body material. Thus, a lower limit for the time-resolution determination of the deformation of the force transducer of approximately 50 µs is reached with a material such as steel or aluminum and a length of the force transducer of 100 mm. In this respect, a speed of sound of approximately 3,000 m/s is included in the calculation, and the time resolution of approximately 50 µs specifies the maximum time interval between two measuring points.

As mathematical evaluation method, a method according to Preisach which is described in the Journal of Physics, Vol. 94, pgs. 277 et seq (1935) is preferred. This is a general physical-mathematical model for describing the magnetic hysteresis in ferromagnetic materials which may, however, be applied to the hysteresis in the elastic deformation of force transducers as follows:

The idea of the Preisach model is to reproduce the hysteresis behavior of a physical system by way of a large number of "elementary hystereses" with a rectangular hysteresis loop. This model is not restricted to describing magnetic hystereses but is also suitable for the model-like determination of other physical systems which have a hysteresis, such as the elastically deformable force transducer discussed in this case.

In the Preisach model of the hysteresis, the physical system is described by the entirety of the specified "elementary hystereses". These elementary hystereses can take up two states depending on the input parameter of the system. Which of these states is taken up is dependent on the value of the input parameter of the system as well as the changeover thresholds of these elementary hystereses.

The description of a physical system by way of this model makes an arithmetical correction of the effects of hysteresis possible due to the mathematical algorithms characteristic of the model. In an improved version of the Preisach model, a considerably more efficient calculation and correction of the effects of hysteresis, which is important for practical use, is possible (cf. M. Haas, Reduzierung von Hysteresefehlern bei Sensoren durch rechnergestutzte Signalverarbeitung (=Reduction of Hysteresis Errors in Sensors by way of Computer-Aided Signal Processing), Institut fur Meβ- und Automatisierungstechnik der Universitat der Bundeswehr, Munich, 1993). In this improved model, only the information concerning the borderlines between elementary hystereses with different states is necessary for describing the hysteresis behavior. The memory required with this model for the arithmetical correction of the hysteresis is considerably less due to the restriction of the information concerning the hysteresis behavior to the borderlines. In this way it is also possible to carry out the cited arithmetical correction of the effects of hysteresis with the aid of inexpensive microcontrollers.

The borderlines or rather the minimum and maximum values of the traction-expansion curve for the elastically deformable force transducer depend on the type, i.e. the geometry of the bending body of the force transducer and the load range allowed as well as, of course, the material used. In the case of a measurement, it is now sufficient, with knowledge of the material properties, to store only the respective minimum and maximum loading states of the force transducer last reached in order to be able to clearly define where the system is located within the borderlines of the minimum and maximum values of the traction-expansion envelope curve.

As already explained above, the sensor arrangement preferably generates an analog weighing signal, wherein the first and the second testing units each comprise an analog-digital converter operating independently of one another, these converters evaluating independently of one another the weighing signal which corresponds to the deformation of the force transducer. The analog-digital converter of the first testing unit preferably has a resolution of 16 to 20 bits while the analog-digital converter of the second testing unit has a resolution of at least 8 bits.

The conversion time of the analog-digital converter of the second testing unit is preferably ≦50 µs.

The conversion time of the analog-digital converter of the first testing unit, which makes the high-resolution weighing signal available, is preferably ≦50 ms.

The second testing unit preferably comprises a preamplifier which amplifies the electrical signal corresponding to the elastic deformation of the force transducer.

In a preferred embodiment of the invention it is provided for the preamplifier and the analog-digital converter of the second testing unit to be integrated in a circuit. This not only reduces the production costs but also simplifies the assembly of the arrangement.

With a view to further simplification, it may be provided for the integrated circuit to include, in addition, a data memory and even the processing unit integrated therein and/or the digital section of the analog-digital converter of the first testing unit.

In the most favorable case, not only the data memory but also the processing unit and the digital section of the analog-digital converter of the first testing unit are therefore integrated in an integrated circuit along with the analog-digital converter of the second testing unit and the associated preamplifier.

During weighing, the high-resolution, corrected weighing signal is, in one embodiment, not released for display until the weighing signal fluctuations do not exceed predetermined limits for a predetermined period of time.

The advantages achievable with the invention consist, in particular, of the fact that a weighing system which is subject during severe conditions to hard jolts with short-term load variations can nevertheless be equipped with a reliable correction of hysteresis and that its functioning is made possible in the first place by the division into two measuring channels with analog-digital converters having conversion rates which are, today, technically possible.

Due to the required high resolution of 16 to 20 bits corresponding to 65,000 to 1,000,000 steps, the analog-digital converters necessary for the operation of such a weighing device are converters having an integrated process. Such converters have, as a matter of principle, long conversion times between 10 and 50 ms which is adequate for the normal operation of the weighing system but not for the collection of the data relevant for the specified correction of the hysteresis error.

A resolution of 7 to 8 bits corresponding to 128 to 264 steps is completely adequate for the information concerning the direction of loading which is necessary, on the other hand, for the correction of hysteresis and so a very fast analog-digital converter can be used in this case, for example, in accordance with the known method of successive approximation. A weighing device constructed in such a manner will be described in the following by way of example.

DETAILED DESCRIPTION OF THE PREFERRED EMBODIMENTS

Figure 1A:
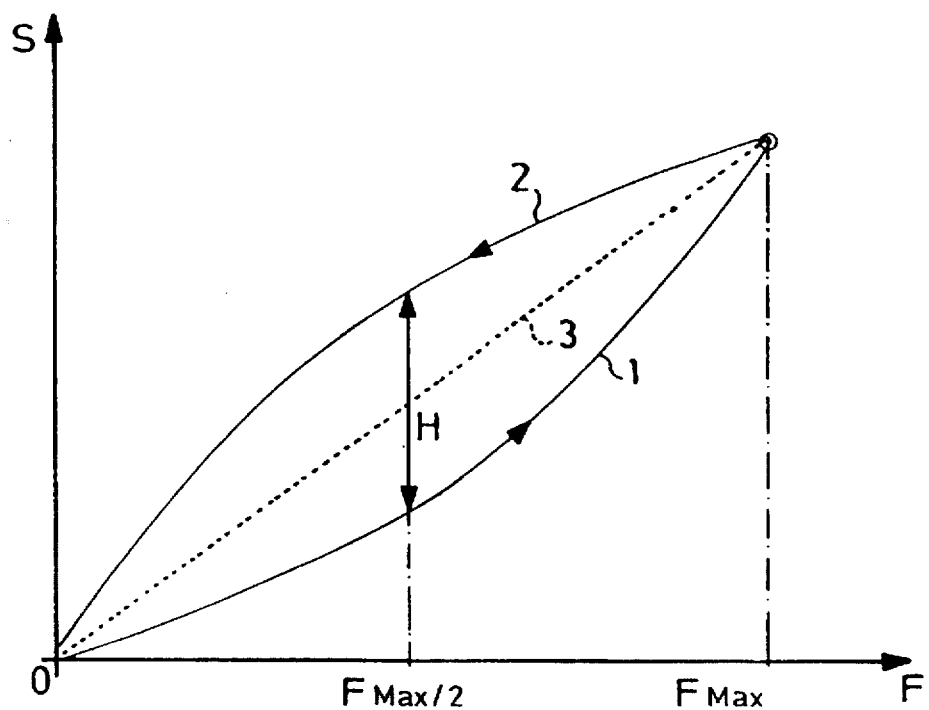
FIGS. 1a and 1b show diagrams with a characteristic hysteresis error curve of the analog measured values of a force transducer.

In FIG. 1a, the analog measured parameter S generated by a force transducer 4 of a weighing device is plotted as a function of the load F. If, in such a weighing device, the load is increased, for example, from the value zero to the maximum load Fmax and the load is subsequently reduced again to zero, clear differences are apparent between the load increasing curve 1 and the load decreasing curve 2. The load decreasing curve 2 is, in most cases, above the load increasing curve 1. The load decreasing curve 2 can, however, also run beneath the load increasing curve 1. The ideal load increasing curve of an error-free force transducer is drawn in as dotted line 3. The maximum difference H which is generally at half the load Fmax/2 is the said hysteresis error.

Qualitatively comparable load increasing curves also result when the loading cycle is not carried out between the zero load and the maximum load but between optional intermediate values.

Figure 1B:
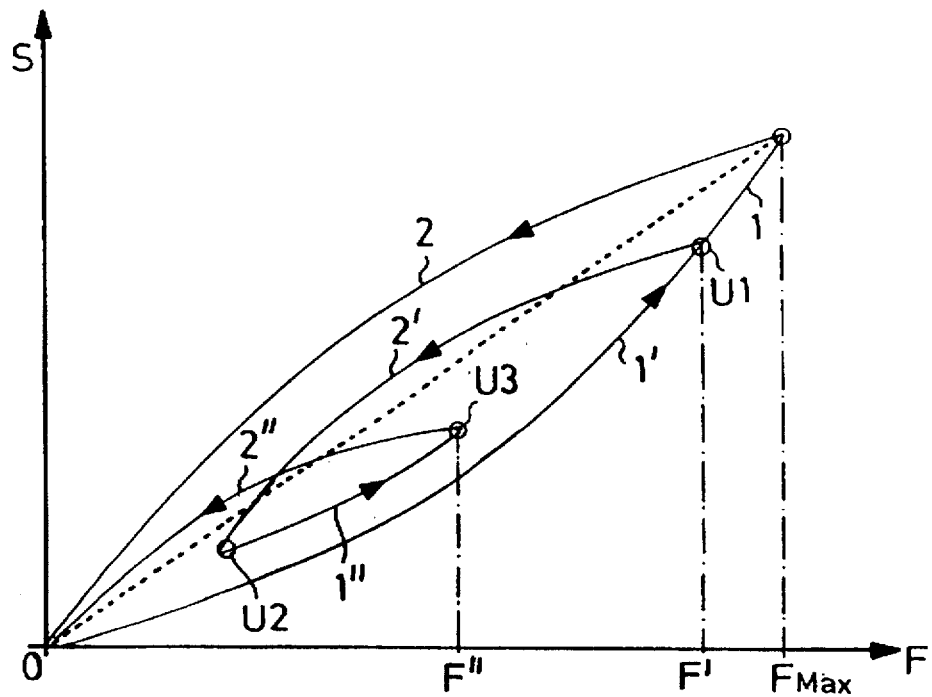

In FIG. 1b, loading states of this type are illustrated in a graphic form.

When a partial load F' (<Max) is placed on the weighing device, a load increasing curve 1' is generated which ends at the turnaround point U1. When this partial load F' is removed from the weighing device and a new, smaller partial load F" is immediately placed on it, the load decreasing curve does not return to zero but, for example, only to the turn-around point U2 in order to then rise again as far as the turn-around point U3 due to the new, smaller partial load F". If this partial load F" is also removed, the load decreasing curve 2" returns to zero.

It may be ascertained that all the load increasing and load decreasing states take place within the envelope curve formed at maximum load by the curves 1 and 2.

Figure 2:
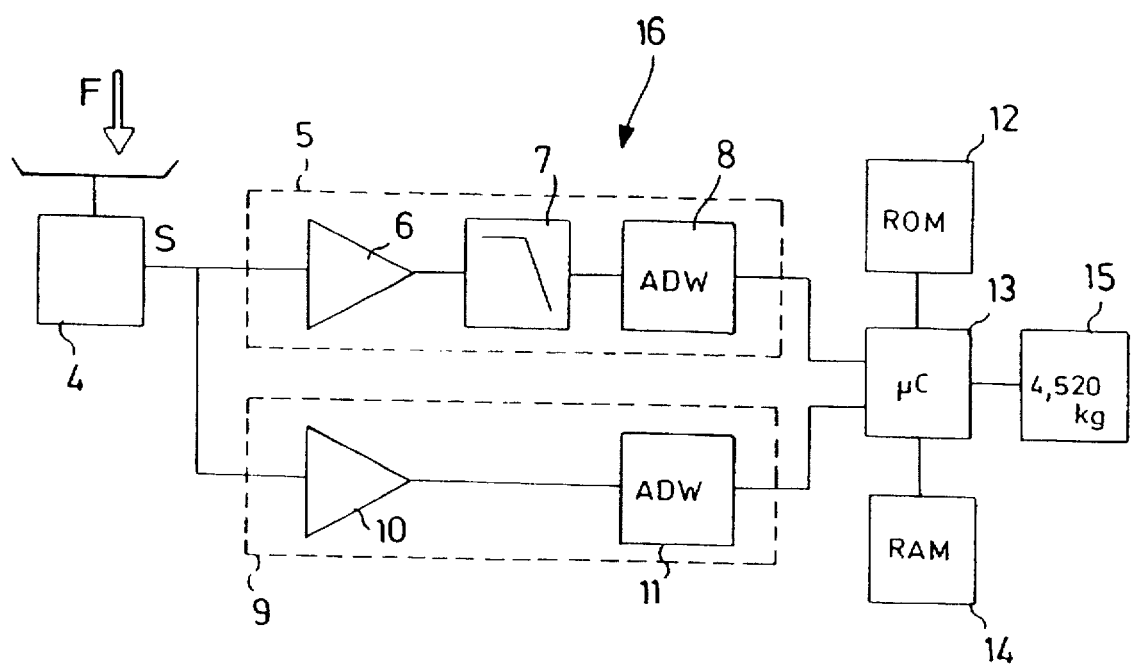
FIG. 2 shows an embodiment of the invention as a block diagram.

FIG. 2 shows the block diagram of a complete weighing device. This weighing device consists of a force transducer 4 which emits an analog measured parameter S dependent on the force F. This measured parameter S is passed to a circuit device 16 and fed into two testing units (channels) 5, 9 for further processing. The first channel 5 consists of a preamplifier 6, a filter 7 as well as a high-resolution, slow analog-digital converter 8 which digitalizes the measured parameter S with the required accuracy and passes this digital information to the processing unit (microcontroller) 13. Parallel thereto, the measured parameter S passes into the second channel 9 which consists of a broadband preamplifier 10 with a very fast response time and an analog-digital converter 11 of a lower resolution but with a very high conversion rate. This "fast" channel 9 is able to process and pass on to the microcontroller 13 very fast load changes (such as, for example, jolts) at the force transducer, as well. The microcontroller 13 calculates the measurement result with a high resolution from the information from the first channel 5 and uses the information from the second channel 9 to ascertain, on what load increasing or load decreasing curve the load state was reached. With both sets of information it is possible to correct the hysteresis error of the force transducer 4 by means of suitable information and processes contained in the read memory 12 and the data memory 14 and pass the error-free weight value to the digital display 15.

The information in the data memory 14 necessary for this correction is different for each respective type of weighing device and is stored in the data memory 14 during the production process for the weighing devices.

In the case of the processes used for the correction, two starting points are, in principle, possible. On the one hand, an attempt can be made to find a mathematical approximation which reproduces the hysteresis behavior and can be used for the correction. On the other hand, it is possible to develop a physical model of the hysteresis and to derive a process for the correction of the hysteresis from this model conception. Such a model is known for the (magnetic) hysteresis of ferromagnetic materials (F. Preisach, Über die magnetische Nachwirkung=Concerning the magnetic Aftereffect, Journal of Physics, Vol. 94, page 277, 1935). With this model which is also suitable, in principle, for describing the mechanical hysteresis found in this case, the system subject to hysteresis is described by an ensemble of elementary hysteresis elements. This physical model has the advantage that it is easy to implement on a microcontroller, such as, for example, the microcontroller 13 used in this case for the weighing device.

A further, advantageous development of the invention consists in the use of a microcontroller 13, in which the functional blocks, i.e. channel 9 with preamplifier 10, analog-digital converter 11, read memory 12 and data memory 14, are already integrated.

Furthermore, the digital section (counter) of the slow analog-digital converter 8 can be integrated, in addition, in the microcontroller 13.

I claim:

1. A weighing device including in combination
   means comprising an elastically deformable transducer
      for providing a signal indicative of the gravitational force on an item to be weighed, said transducer having residual material hysteresis, first means responsive to said signal for providing a high resolution representation of the magnitude of the signal, said first means having a relatively low sampling frequency, second means responsive to said signal for providing a low resolution representation of the magnitude of the signal, said second means having a relatively high sampling frequency, and means responsive to said low resolution representation for correcting errors in said high resolution representation caused by hysteresis in the transducer.

2. The weighing device of claim 1, wherein said signal is analog and wherein each of said first and second means comprises an analog-to-digital converter.

3. The weighing device of claim 2, wherein said analog-to-digital converter of said first means has a resolution of between 16 and 20 bits and said analog-to-digital converter of said second means has a resolution of at least 8 bits.

4. The weighing device of claim 2, wherein said analog-to-digital converter of said first means has a conversion time of not more than 50 ms.

5. The weighing device of claim 2, wherein said analog-to-digital converter of said second means has a conversion time of not more than 50 μs.

6. The weighing device of claim 1, wherein said first means comprises a preamplifier and means coupling the signal thereto.

7. The weighing device of claim 6, wherein said first means includes a low-pass filter coupled to said preamplifier.

8. The weighing device of claim 2, wherein said second means comprises a preamplifier and means coupling the signal thereto.

9. The weighing device of claim 8, comprising an integrated circuit including the preamplifier and the analog-to-digital converter of said second means.

10. The weighing device of claim 9, wherein the integrated circuit further includes the analog-to-digital converter of said first means.

11. The weighing device of claim 1, wherein the correcting means includes a processing unit and a random access memory and a read only memory.

12. A weighing device including in combination means comprising an elastically deformable transducer for providing a signal indicative of the gravitational force on an item to be weighed, said transducer having residual material hysteresis, first means responsive to said signal for providing a high resolution representation of the magnitude of the signal, said first means having a relatively long conversion time, second means responsive to said signal for providing a low resolution representation of the magnitude of the signal, said second means having a relatively short conversion time, and means responsive to said low resolution representation for correcting errors in said high resolution representation caused by hysteresis in the transducer.

* * * * *